Jan. 1, 1974  R. P. McNERNEY  3,783,057
WIRE INSULATION SPLICING TECHNIQUE FOR HIGH
TEMPERATURE WELL LOGGING CABLE
Filed Dec. 30, 1971

United States Patent Office 3,783,057
Patented Jan. 1, 1974

3,783,057
WIRE INSULATION SPLICING TECHNIQUE FOR HIGH TEMPERATURE WELL LOGGING CABLE
Richard P. McNerney, Houston, Tex., assignor to Schlumber Technology Corporation, New York, N.Y.
Filed Dec. 30, 1971, Ser. No. 214,233
Int. Cl. H02g 15/08
U.S. Cl. 156—49                              4 Claims

ABSTRACT OF THE DISCLOSURE

Well logging cables substantially longer than 10,000 feet and operable in logging wells with bottom hole temperatures up to 600° F. are made feasible through a technique of splicing TFE fluorocarbon insulating material to FEP fluorocarbon insulating material using heat and pressure.

BACKGROUND OF THE INVENTION

Conductors for transmitting power and/or signals for use in well-logging operations are typically placed within the core of high tension cables which are used to raise and lower the logging apparatus to the bottom of the well bore. The cables ordinarily comprise an inner, axial core of one or more conductors, usually made of copper wire. Surrounding each conductor is a coating of electrical insulation material. If more than one conductor is to be employed within the cable core, as is often the case, the individual conductors are kept separated by displacing them in a matrix or jacket of conductive neoprene or the like. One or more layers generally consisting of a plurality of galvanized steel wires spiral-wrapped around the length of the cable core make up the outer, armor surface of the cable. Overall diameter of a typical cable will vary from about $2/10$ of an inch for monoconductor cables to about ½ inch for multiconductor cables. The steel wires making up the armor layer or layers typically range from about .02 inch to about .05 inch in diameter.

The conductor insulation in such a construction must be relatively flexible, capable of withstanding axial stresses, and continuous and flaw-free for the length of the cable. Because the conductors must function at the bottom of very deep wells, the insulation must also be stable in moisture and resistant to the very high temperatures and extreme pressures existing at such well bottoms. Needless to say, materials used as insulation must also be capable of maintaining their electrical resistance, i.e. their electrical insulating characteristics, under those extremely adverse conditions.

As the search for fossil fuels continues, wells are being drilled deeper and deeper. It is not uncommon now to have wells drilled to depths of 20,000 feet or more. Such drilling is also being carried out in areas where higher thermal gradients in the earth's crust, e.g., in the order of 20° F. per 1,000 feet, are experienced. These two factors add up to the fact that wells with bottom hole temperatures in the order of 500 to 600° F. are now common. This means that the requirements for conductor insulation which will function acceptably at such levels become much more rigid. So rigid, in fact, that prior to the present invention it was substantially impossible to carry out logging operations at the base of such well bores. This was primarily due to failure of the electrical insulation. Attempts to overcome the excessive temperature problem by cooling the logging apparatus with drilling mud were only marginally effective. As a result, many operators simply gave up trying to log a well when bottom hole temperatures began to approach 500° F.

BRIEF SUMMARY OF THE INVENTION

The present invention provides a well logging cable capable of use in logging at temperatures up to 600° F., and involves methods of making such a cable. More particularly, the present invention involves a technique wherein two different types of high temperature resistant fluorocarbon polymeric materials may be spliced together to make up the electrical insulation material surrounding the conductor within the core of a well logging cable. The resulting composite insulation retains its temperature stability and high electrical resistance substantially uniformly throughout the length of a cable, even where the cable length exceeds 10,000 feet.

DESCRIPTION OF THE INVENTION

Figure 1:
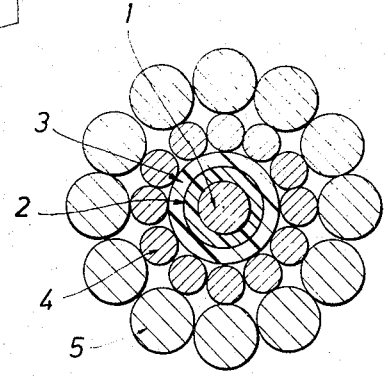
FIG. 1 is a sectional view of a single conductor well logging cable in accordance with the invention.

A well logging monoconductor cable in accordance with the invention is illustrated in section in FIG. 1. As there shown, the cable comprises an inner, axial conductor 1, which may consist of one or more conducting wires, usually made of copper. Surrounding the conductor 1 is a coating or layer 2 of electrically insulating homopolymer of tetrafluoroethylene. Around the layer 2 is a jacket 3 of a material which serves to protect the insulating material from deformation due to mechanical stress of the cable armor when the cable is under tension. The monoconductor cable shown has a double layer of armor. The first layer 4 consists of a plurality of wires spirally wrapped around the length of the insulated core. Another layer of armor 5 consisting of a plurality of wires of larger diameter is spirally wrapped around the layer of armor 4 (ordinarily, the second layer of wires is wrapped in opposite lay with respect to the first layer). The wires of the armor layers may consist of any suitable material for strength and durability, but galvanized steel is preferred.

The fluorocarbon polymer produced by homopolymerizing tetrafluoroethylene possesses the characteristics of strength, flexibility, high electrical resistance and thermal resitsance to temperatures greater than 500° F. which are necessary for successful insulation under the adverse conditions found in well bores. This polymer is commonly referred to by the acronym TFE and will be referred to as such hereinafter. It has a functionally operable temperature limit in the order of 620° F. Unlike most other fluorocarbon polymers, however, TFE is not a truly thermoplastic polymer. Rather it goes through a transition at temperatures approximating 620° F. to a form which may be described as "visco-elastic" or "gel-like." This property renders TFE incapable of extrusion as a melt, which is the standard technique for applying insulation to wire. For a long time, therefore, there was no way that TFE could be used as electrical insulation on conductor wires in logging cables.

Techniques of applying TFE to wire as an insulating material have been developed, however. One such technique involves first wrapping the wire with a tape of TFE and later fusing that tape until it is a "homogeneous"

mass. In another method, the TFE material is "extruded" around the wire as a "paste" formed by mixing finely divided TFE particles with an oil. This extrudate must then be heated to evaporate the oil and to fuse, or "sinter," the TFE particles to a homogeneous mass. But for reasons which will become apparent in the following discussion, neither of these processes has been found capable of producing flaw-free insulation on wires of substantial length.

In the "extrusion" process, the finely divided TFE must be mixed with a lubricant to form a paste, which is then partially compressed into a shape, called a "preform." The lubricant, which is absolutely essential if the extrusion is to be successful, amounts to about 18% of the preform weight. However, to obtain a proper insulating material, this lubricant must be removed completely prior to any fusion of the TFE. Departure of the lubricant leaves microvoids in the extrudate, which microvoids usually close during the sintering process. Inevitably, however, some do not, and this is the origin of the susceptibility to electrical breakdown in the TFE insulation. In a 20 AWG wire, for instance, insulated with a 15 mil coating of extruded TFE and tested by subjecting it to a differential in excess of 1,000 volts, there will be a short circuit through the insulation once every three to four thousand feet on the average.

The electrical grade TFE tape to be used in the wrapping technique first referred to above is made by the same type of process as the "extrusion" technique previously discussed. In other words, an oil-containing preform must be prepared first and then forced through an orifice to form the tape, which is then heated to drive off the lubricant. Because of this, there is also some microporosity present in the tape. This is not usually a serious matter, however, since multiple lap wrapping in tape construction minimizes the possibilities of electrical breakdown. The serious problems connected with the use of TFE tape are first, that it is limited in length by the size of the TFE preform from which it is made and, additionally, that it is sometimes quite difficult to develop sufficient bondage between overlapping tape layers during the fusion operation. This bonding during the latter operation does not remotely approach formation of a "homogeneous mass" but when the tape is applied under sufficient tension and properly fused the bonding is adequate. However, when long lengths of conductor are desired, it is simply not possible to stop a tape wrapping machine, change tape rolls, restart the machines and maintain the quality of insulation sufficiently uniform.

There are ways of feasibly circumventing the difficulties inherent in both the extrusion and wrapping processes for applying TFE insulation to conductor wires. For example, if the extrusion is carried out in two separate operations, thus obtaining two separate layers of TFE, there will be a very low probability that flaws in the two layers will coincide. Similarly, a feasible method for producing flaw-free lengths of TFE tape wrapped insulation on wire would start with the use of a single head tape wrapping machine, wrapping a single serving of tape per pass. Each time the machine is stopped, the insulation can then be flagged at that point as a potential failure zone. On the second pass, the operator controls the wrapping so that potential failure zones in the second servings do not coincide with those in the first.

In any event, the application of acceptable TFE insulation to conductors of long length carries with it a premium price for such insulation. In addition, even with the techniques recited above, it has not been feasible to produce acceptable TFE insulation on conductors longer than about 10,000 feet (much less than that with the wrapping technique).

In accordance with the present invention, therefore, a method of successfully splicing TFE insulation to another insulating material was developed to produce trouble-free logging cables longer than 10,000 feet.

Production of composite insulated conductors by the successful splicing technique of this invention also may reduce the amount of TFE actually required. The length of TFE necessary for such a composite insulated conductor can now be accurately determined by a consideration of the bottom hole temperature in relation to the temperature gradients within the well bore. Assuming a thermal gradient in the neighborhood of 22° F. per 1,000 feet of well depth and a temperature of 600° F. at the well bottom, it will be apparent that within about 7,500 feet, the temperature will have reached a point where another insulation, which can be applied more economically to the conductor, can be used. If a cable with a composite insulation on the conductor were prepared for such a well, therefore, a minimum of only 7,500 feet of double-layered TFE insulated conductor would be necessary.

The second insulating material which is to be spliced to TFE in producing a composite insulation according to the invention must be one which possesses the characteristics of an electrical insulation generally as outlined earlier (although, of course, it will not have the temperature range of TFE). It also must possess some degree of compatibility with TFE so that joinder under the techniques hereindescribed will be successful. A material found to be especially suited for making a composite insulation with TFE is the fluorocarbon copolymer which is currently being marketed by E. I. du Pont under the trademark "FEP Teflon." According to the manufacturer, this fluorocarbon copolymer is prepared by copolymerizing the monomers tetrafluoroethylene and hexafluoropropylene. The properties will vary slightly depending on such things as molecular weight and proportion of monomers but, in general, any of the various resins marketed under the trade name are acceptable. Hereinafter, the acronym FEP will be used to refer to all such materials.

FEP is a truly thermoplastic material, softening and melting in the range between 450° and 525° F. It can therefore be extruded directly on the conductor wire in a continuous process.

In the process of the present invention, a bond is produced between TFE and FEP which possesses the characteristics necessary for attaining a successful composite insulation for use in well logging cables. Such a bond is produced through the simultaneous application of heat and pressure to an area of splice made in the manner hereinafter described.

Figure 2:
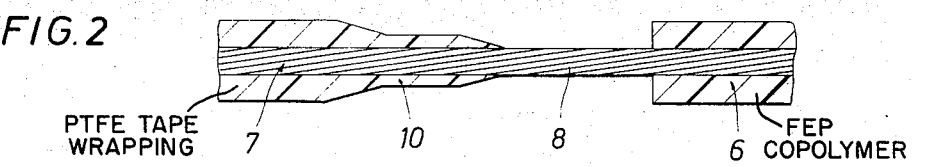
FIG. 2 is a sectional view of a length of conductor showing the area of insulation splice prior to application of the bonding material, in accordance with the invention.
Figure 3:
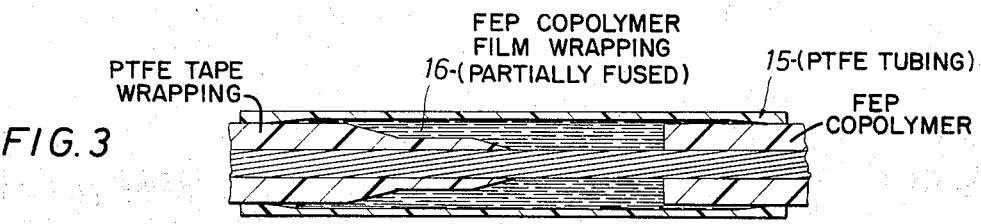
FIG. 3 is a sectional view of a splice prepared using shrinkable TFE tubing to generate the compressive forces necessary to assure adequate bonding of the insulation materials, in accordance with the invention.

In one embodiment of the invention, a single length of conductor is insulated at opposite ends with the required amount of each material. Referring to FIG. 2 of the drawings, one end, 6, of the conductor is first coated with extruded FEP to the desired length and then the high temperature resistant end 7 is wrapped with unsintered TFE tape using typical overlap and serving to attain the desired wall thickness. Prior to fusing, the TFE wrap at the junction area 9 is hand altered to give a tape 10 receding to the conductor 8 at the end point of the FEP extrusion such as is shown in FIG. 2. The TFE is then fused either by machine or hand to a point as close to the FEP extrusion as possible without melting the FEP. Any unsintered TFE is removed and the TFE tape is then sanded with fine emery cloth to facilitate bonding. The gap 9 between the TFE and FEP insulations is then filled with tightly wrapped FEP film extending the wrapping to about an inch past the gap on both ends, thus creating a slight bulge of FEP material at the area of splice as can be seen in FIG. 3. Finally, heat and pressure are applied to the area of the splice until the FEP film has melted and merged with the FEP extrusion while simultaneously forming a tight bond with the TFE. The resultant splice can be ground to size if necessary or desirable to remove any remaining bulge.

Alternatively, the conductor may be insulated to the desired length first with TFE, employing either the tape wrapping or double layer extrusion technique. This procedure enables the fusing to be carried out prior to extruding the FEP coating onto the conductor. Here, also, it is possible to omit the step of wrapping the splice area with FEP film. If the TFE insulation has previously been tapered down to the conductor and sanded, the FEP may be extruded right up to and over the edge of the TFE. This area of overlap thus provides the extra thickness or "bulge" necessary to assure that the material is compressed within the mold during the heating step.

Figure 4:
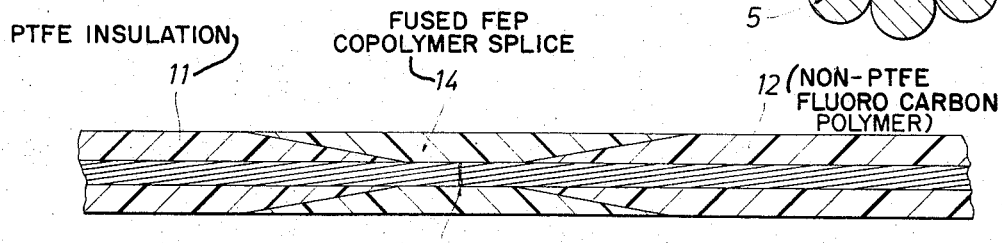
FIG. 4 is a sectional view of a completed splice in which both the conductor wires and the conductor insulation from two separate lengths of insulated conductor have been joined in accordance with the present invention.

It is also possible to employ the technique of this invention to bond the insulating materials of two separate conductor wires which have themselves been spliced together. The insulation on each length of conductor may then be tapered down to the wire and the gap between them filled by wrapping FEP film around the spliced wires overlapping the edges of the insulation as recited above. Finally, the area of the splice is simultaneously heated and compressed until the bond is formed. Such a splice is shown in FIG. 4. As can be seen from the figure, the insulation 11, 12 at the end of each conductor has been tapered down to the wire and the two conductor wires have been spliced at point 13. The area of the wire splice has been wrapped with FEP film which, in the drawing, is shown after it has been fused to a solid, bonding mass 14.

There are no particular limits on the amount of compression necessary to assure satisfactory bonding, so long as there is at least some measurable amount. In general the compressive forces should be substantially uniform around the area to be spliced and of such magnitude as will force the FEP material up against the TFE at all points of contact. For example, it is known that TFE tubing which has been stretched has a tendency to shrink back to its original size when heated near its fusing point. It has been found that this shrinkage is enough to provide adequate pressure during the heating step when such a tube is slid over the splice area. FIG. 3 shows such a tube 15 over the area of the splice. The "bulge" 16 of FEP material is shown in its partially compressed and fused state. A tight fit on the shrinkable tubing used will be sufficient.

The area of the splice must be heated to about 600° F. to assure that the FEP completely fuses. Care should be taken, however, to assure that the temperature outside the splice area does not rise above about 450° F. Otherwise the FEP insulation on the conductor will melt and may destroy the efficacy of the splice. For this reason, and also because even the best TFE tubing does not shrink completely uniformly, it is preferred to carry out the heating and compression in a mold constructed especially for that purpose.

Figure 5:
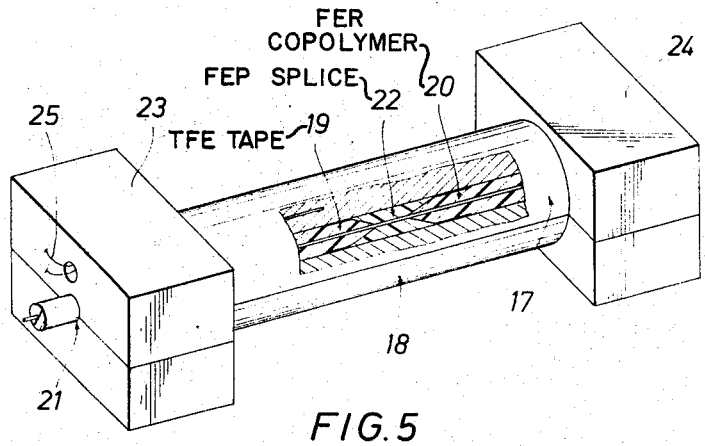
FIG. 5 is a perspective view of a compression mold for use in carrying out a preferred embodiment of the invention, with a cut-away of the inside of the mold.

Here again, details of construction are not critical. A cut-away view in perspective of a typical mold is shown in the drawings, FIG. 5. The splice being formed is that shown in FIG. 4. The mold may be made of any standard material generally used, aluminum being preferred because of its light weight and greater conductivity. The mold should of course be made in two halves 17, 18, for clamping around the insulated conductor at the area of splice between the two insulation materials 19, 20. If the two halves of the mold when clamped together fit smoothly around the circumference of the non-treated portions of insulated conductor, as shown at 21, and the bulge 22, resulting from filling the gap between the two insulation materials with FEP, is slightly wider in diameter than such portions, adequate compression will be generated. Alternatively, the bore of the mold may be made narrower than the conductor, at least at the center portion which is to fit over the splice in order to "squeeze" the splice area. Heat sinks 23, 24, should be provided within the mold on either side of the central area which encompasses the splice so as to provide a means for drawing off excess heat. A thermocouple 25 may be provided for monitoring heat build-up at the splice area. The mold may be heated by any suitable external source of heat (not shown).

EXAMPLE I

Three splices were made using TFE shrinkable tubing to provide the pressure during the fusing operation. Four feet of 75 mil O.D. copper conductor was insulated over two feet with a 17 mil wall of "Teflon FEP-100" extrusion. The remaining portion was hand wrapped using .004" x ⅜" unsintered TFE tape, type W (3M Company, pigmented brown). The tape was wrapped in two layers opposite lay, ⅔+ overlap on the first layer, ½+ overlap on the second. Fusing TFE was carried out by direct application of heat. The color change occurring during fusion was quite helpful in obtaining adequately fused insulation without resin degradation. Thereafter, the TFE insulation was tapered down to the conductor, sanded and the area of exposed conductor wrapped tightly with a .002 inch thick tape made from "Teflon FEP-100" until a bulge extending about 10 mils beyond the original O.D. of the insulation on either side of the gap was created. A length of TFE tubing, about 6 inches long, I.D. 125 mils, O.D. 165 mils was slid over the area of the splice. Spraying the inside surface of the tube with a mold release compound helped slide it over the splice. The entire construction was then rotated slowly for about 90 seconds in the path of a stream of heat emanating from a heat gun operating at 700° F. Each splice so constructed was initially screened by subjecting it to a 10,000 volt differential, conductor to ground, in water for one minute and thereafter thoroughly tested in water in a hydraulically controlled autoclave to temperatures of 500° F. at pressures up to 10,000 p.s.i. After testing, each sample had a short in the TFE tape wrapped portion. One splice had split at the FEP extrusion to FEP tape junction, but had otherwise remained intact. The other two splices performed succesfully.

EXAMPLE 2

Three splices were made in the following manner: Type B-9 bright copper conductor, four feet long, .038 inch O.D. insulated with 12 mils of an extrusion of FEP-100 Teflon, was used. The FEP extrusion was stripped off half the length of the wire and TFE tape hand wrapped in its place. The tape used was .004" x ⅜" type W (3M Company, pigmented brown). Construction was two layers opposite lay 50% plus overlap each layer. The TPE tape was then fused taking care not to apply heat near the FEP extrusion (if it fuses it will bond tightly to unsintered TFE). All unsintered TFE was thereafter removed and the insulation tapered down to the conductor at the ends to be spliced. The insulation gap thus created was then wrapped with clean .001 inch thick FEP film, filling the gap and covering the entire area of the would-be splice (about 4 inches overall) to an O.D. several mils greater than the original O.D. of the insulated conductor. The thus-wrapped splice was then centered in an aluminum mold with an internal chamber bored to just fit around the original conductor and the mold clamped securely. The mold was then heated by an external source of radiant heat, the temperature at the center and at the exit points of the wire being monitored all the while to be sure that the ends are maintained below 450° F. while the center reaches 550° F. After cooling, the splices were removed from the mold and the oversized areas were sanded down with very fine sandpaper. These splices remained intact physically and electrically when tested in a water-filled, hydraulically pressurized autoclave to 500° F. and 10,000 p.s.i. Shorting occurred in the TFE portion of all samples, but only between 450° and 550° F. The splice remained intact and functional in all samples.

Although the above examples describe the present invention in connection with a monocable, that is to say a logging cable having a single central conductor, it is to be specifically understood that the invention is equally applicable to a multiconductor cable having a plurality of conductors displaced around a central conductor with the interstitial spaces filled with a matrix of conductive neoprene or the like. In this latter case, the insulation materials for each conductor are spliced in accordance with the principles of this invention.

The above description demonstrates that well logging cables capable of use in deep wells at bottom temperatures up to about 600° F. can be made in accordance with the present invention. It should also be apparent that the technique of the present invention can be employed to produce a composite insulation on conductors for use in other applications where only a portion of the conductor length is required to be subject to the severe temperature conditions dictating use of TFE as an electrical insulation material. In this manner, substantial savings in the application of the insulation materials to the conductor may be realized.

What is claimed is:

1. The method of making a well logging cable exceeding ten thousand feet in length, at least a portion of which is capable of functioning at temperatures above 500° F., which comprises insulating adjacent portions of the length of the conductor of said well logging cable with at least two different types of fluorocarbon polymer, that portion of the length of said conductor to be employed at operating temperatures above 500° F., being insulated with polytetrafluoromethylene insulating material, and forming a composite insulation on said conductors by splicing the two fluorocarbon polymer insulation materials in a process comprising the steps of:

(1) applying to the area of the conductor, at the point where said two different insulation materials join, an amount of melt extrudable thermoplastic fluorocarbon material sufficient to cover the conductor and fill the gap between said two different adjacent insulation materials, overlapping the adjacent insulation materials to form a bulge at the area of application which has a diameter slightly wider than the original outer diameter of the insulated conductor, (2) compressing said area of application uniformly around the circumference of the bulge, thereby creating a tendency in said bulge to assume the original outer diameter of said conductor insulation;

(3) while the area of application is being compressed, simultaneously applying heat to said area of application in such manner as to fuse the melt extrudable thermoplastic fluorocarbon material overlapping said adjacent insulation materials while at the same time maintaining the temperature of said insulation materials adjacent the area of application below their melting points.

2. The method of claim 1 wherein the two adjacent insulation materials are polytetrafluoroethylene and the copolymer of tetrafluoroethylene and hexafluoropropylene.

3. The method of claim 1 wherein said melt extrudable thermoplastic fluorocarbon material is the copolymer of tetrafluoroethylene and hexafluoropropylene.

4. The method of claim 1 wherein the compression and heating of said area of application are carried out in an externally heated metal mold constructed with having heat sinks at its ends, so as to draw off excess heat from the two adjacent insulation materials at said area of application of said melt extrudable thermoplastic fluorocarbon material.

References Cited
UNITED STATES PATENTS 3,356,551   12/1967   Glenn et al. _____ 174—84 R X

FOREIGN PATENTS 773,832   5/1957   Great Britain _____ 174—110 FC

DARRELL R. CLAY, Primary Examiner

U.S. Cl. X.R.

174—84 R, 110 FC; 249—79, 90, 95; 425—40; 161—189